(12) United States Patent
Kezerian

(10) Patent No.: US 12,359,900 B2
(45) Date of Patent: Jul. 15, 2025

(54) COMPOSITE SABOT COMPRISING ANGLED UNDULATED FIBERS, SYSTEM, AND METHODS OF MAKING AND USING THE SAME

(71) Applicant: Simulations, LLC, East Granby, CT (US)

(72) Inventor: Jeffrey M Kezerian, East Granby, CT (US)

(73) Assignee: Simulations, LLC, Granby, CT (US)

( * ) Notice: Subject to any disclaimer, the term of this patent is extended or adjusted under 35 U.S.C. 154(b) by 34 days.

(21) Appl. No.: 18/495,270

(22) Filed: Oct. 26, 2023

(65) Prior Publication Data

US 2024/0263928 A1    Aug. 8, 2024

Related U.S. Application Data

(60) Provisional application No. 63/420,073, filed on Oct. 27, 2022.

(51) Int. Cl.
| | | |
|---|---|---|
| *F42B 14/06* | (2006.01) | |
| *B29C 70/24* | (2006.01) | |
| *B29C 70/68* | (2006.01) | |
| *B29C 70/70* | (2006.01) | |
| *B29K 105/08* | (2006.01) | |
| *B29L 31/00* | (2006.01) | |

(52) U.S. Cl.
CPC ............ *F42B 14/068* (2013.01); *B29C 70/24* (2013.01); *B29C 70/682* (2013.01); *B29C 70/70* (2013.01); *B29K 2105/0845* (2013.01); *B29K 2313/00* (2013.01); *B29L 2031/777* (2013.01)

(58) Field of Classification Search
CPC .................................................. F42B 14/06–08
USPC ...................................... 86/52; 102/520–523
See application file for complete search history.

(56) References Cited

U.S. PATENT DOCUMENTS

| | | |
|---|---|---|
| 3,738,279 A | 6/1973 | Eyre et al. |
| 3,802,345 A | 4/1974 | La Costa |
| 4,187,783 A | 2/1980 | Campoli et al. |
| 4,296,687 A | 10/1981 | Garrett |
| 4,382,411 A | 5/1983 | Ambrosini |
| 4,535,698 A | 8/1985 | Yuen |
| 4,542,696 A | 9/1985 | Bisping et al. |
| H403 H | 1/1988 | Glasser |
| 4,756,255 A | 7/1988 | Rosenberg et al. |
| 4,936,220 A | 6/1990 | Burns et al. |
| 4,953,466 A | 9/1990 | Von Gerlach |
| 4,958,571 A | 9/1990 | Puckett |

(Continued)

OTHER PUBLICATIONS

John Tsibouklis and Thomas G. Nevell; Ultra-Low Surface Energy Polymers: The Molecular Design Requirements; Advanced Materials; Apr. 17, 2003; 647-650; Wiley, Weinheim.

*Primary Examiner* — Troy Chambers
*Assistant Examiner* — Benjamin S Gomberg
(74) *Attorney, Agent, or Firm* — UConn IP Law Clinic; Robert Bertekap, III; Torsten Voigt

(57) ABSTRACT

A sabot petal is described herein comprising a plurality of woven axial and undulated fibers angled to transfer setback loads. In some cases, the petal is a one-piece component configured to be positioned around a long rod projectile or other aerostructures or aeroshell shapes to be launched with in a gun bore, or rocket or missile launch tube. Corresponding systems and methods are also disclosed.

20 Claims, 6 Drawing Sheets

(56) References Cited

U.S. PATENT DOCUMENTS

| | | | |
|---|---|---|---|
| 4,974,517 A | 12/1990 | Kraft et al. | |
| H941 H | 8/1991 | Wyluda | |
| 5,196,650 A | 3/1993 | Cytron | |
| 5,259,321 A | 11/1993 | Pahnke | |
| 5,635,660 A * | 6/1997 | McGovern | B29C 43/36 86/21 |
| 5,789,699 A * | 8/1998 | Stewart | F42B 14/061 102/521 |
| 6,279,214 B1 * | 8/2001 | Kassuelke | F42B 14/061 102/521 |
| 6,655,293 B1 | 12/2003 | Henry et al. | |
| 6,782,830 B1 | 8/2004 | Candland et al. | |
| 6,783,095 B1 | 8/2004 | King et al. | |
| 6,829,997 B1 | 12/2004 | Hillerman | |
| 7,594,472 B1 * | 9/2009 | Parratt | F42B 14/061 102/521 |
| 7,935,208 B2 | 5/2011 | Park et al. | |
| 8,142,586 B2 * | 3/2012 | Park | F42B 14/061 156/154 |
| 8,561,544 B2 | 10/2013 | Baumann et al. | |
| 8,678,042 B2 | 3/2014 | Quigley et al. | |
| 8,695,507 B1 | 4/2014 | Musali et al. | |
| 8,887,641 B1 | 11/2014 | Manole et al. | |
| 8,931,416 B2 | 1/2015 | Schneider et al. | |
| 9,052,173 B2 | 6/2015 | Michael | |
| 9,677,863 B1 * | 6/2017 | Palathingal | F42B 14/061 |
| 9,714,819 B1 | 7/2017 | DeMeester et al. | |
| 2009/0107355 A1 * | 4/2009 | Park | F42B 14/061 102/521 |
| 2010/0095863 A1 | 4/2010 | Kolnik et al. | |
| 2010/0276082 A1 * | 11/2010 | Park | F42B 14/061 156/276 |
| 2011/0214582 A1 | 9/2011 | Glasser | |
| 2011/0271825 A1 | 11/2011 | Howland | |
| 2012/0216699 A1 * | 8/2012 | Fanucci | F42B 12/06 86/52 |
| 2013/0000506 A1 | 1/2013 | Minnicino, II | |
| 2016/0102953 A1 | 4/2016 | Kalifa et al. | |
| 2016/0282094 A1 | 9/2016 | Brown | |
| 2017/0146329 A1 | 5/2017 | Scarr | |
| 2018/0356194 A1 | 12/2018 | Kezerian | |
| 2019/0017792 A1 | 1/2019 | Kezerian et al. | |
| 2021/0156656 A1 | 5/2021 | Kezerian | |

* cited by examiner

COMPOSITE SABOT COMPRISING ANGLED UNDULATED FIBERS, SYSTEM, AND METHODS OF MAKING AND USING THE SAME

CROSS REFERENCE TO RELATED APPLICATIONS

This application claims priority to, and the benefit of, U.S. Provisional Patent Application No. 63/420,073 filed on Oct. 27, 2022, the contents of which are incorporated by reference herein in their entirety.

FIELD OF THE INVENTION

The embodiments disclosed herein relate to composite sabots for small to large caliber projectiles, airframes, missiles, rockets, interceptors, aerostructures, flight bodies, and other similar payloads.

BACKGROUND

Sabots are used in gun bores during firing (launching) to "guide and carry" projectiles, and at times complex integrated launch packages (ILPs), during the entire in-bore launch event. The sabot, in its least demanding role, keeps the projectile centered in-bore while preventing the launch package from contacting the barrel inner surface. For more advanced and demanding applications in many ILPs, the sabot is also a critical load path that assists in transferring the actual forces generated by the propellant gas to the projectile which accelerates the entire launch package down bore. Sabots perform other functions such as housing the obturator (the main seal), which seals the propellant gases behind the launch package preventing the gas from leaking past the seal and projectile, an air scoop feature (rear or aft scoop) as part of their geometry which initiates sabot discard upon muzzle exit, other aero designed features that assist in initiating muzzle exit discard, and metal or polymer riders that are placed between the sabot and bore surface to minimize barrel wear and decrease friction. While the sabot performs some or all these functions, all sabot petals must be structurally designed to withstand the high compressive and tensile stresses induced by its own inertia, as well as the stresses induced when part of load path carries the projectile and other ILP components down bore during the launch event. For launch packages where sabots are utilized and the gas pressure is accelerating the sabot and launch package, the job of the sabot is to transfer some or all the resulting force to the projectile, e.g., long rod penetrator, ogive shaped airframe, rocket casing, and so on, so the launch package accelerates with the sabot. A well-known method used at the sabot-projectile interface to transfer that accelerating force from one component to another is with pressure flanks (buttress teeth) and mating grooves. It is a mechanical interface that is engineered with sufficient bearing and shear strength to transfer the load from the sabot to the projectile body (e.g., long rod penetrator, ogive airframe, cylindrical airframe, rocket case, interceptor, and any projectile body), without structurally failing the teeth. This method of load transfer has existed for many decades with the physics at the interface fully understood and fielded in various projectile munition packages throughout the U.S. Army.

The sabot is the device assembled around the outside of the projectile that keeps the projectile centered in the gun bore during launch. Since the sabot is discarded upon muzzle exit it must be designed so it can separate (discard) itself from the projectile; this is commonly done by having the sabot made of two or more parts (two or more petals). It is more common for two to four petals per sabot, but a greater number of petals is also appreciated. When all the petals are assembled around the projectile it is that final assembly of petals referred to as the sabot. Upon muzzle exit these petals begin to jettison away from the projectile, initiated by the fluid pressure in front of the sabot developed in-bore during launch, and then the high velocity air impacting the sabot once outside the barrel continues to lift and ensure the petals are fully discard.

Decreasing the mass of sabots is an ongoing and routinely desirous goal, and when using leading edge carbon, boron, or glass based composite materials to lower the sabot mass, the benefits are significant when compared to conventional sabot materials such as aluminum. Existing and heritage sabots that use pressure flanks (buttress teeth) and grooves have been made of aluminum and carbon fiber reinforced polyester (CRFP) composites. The final shape of the pressure flanks and grooves on the sabot are formed during secondary computer numerical control (CNC) machining. The manufacturing process for current-day composite sabot petals consists of a complex process including significant manual touch-time. To fabricate these composite petals currently requires time intensive steps that include multi-layered 2D lamina circumferentially stacked and radially off-set into laminate wedges that when assembled and cured to other laminate wedges they eventually yield one petal. The final cured petal is then machined that ultimately yields all pressure flanks and grooves, outer surfaces and shapes, inner surface shapes, and so on. This complex process is required for each petal per sabot and is costly.

SUMMARY

One embodiment described herein is a sabot petal comprising a plurality of woven undulated fibers angled to transfer setback load from the petal to the projectile. In embodiments, the petal is a one-piece component configured to be positioned around a projectile, e.g., a long rod penetrator or interceptor to be launched as part of an ILP in a gun. As stated, the petal transfers the launch forces to the long rod penetrator through pressure flanks and mating grooves. In some cases, the petal is positioned not only around long rod penetrators it can also be positioned around other aerostructure or aeroshell shapes or rockets to be launched in a gun, or in a missile launch tube.

In embodiments, the petal is formed from a composite comprising fibers within a matrix (e.g., a polymeric or metal resin). In some cases, the petal comprises carbon, glass, or boron fibers reinforced in a polymer matrix composite. This sabot petal is created by weaving fiber tows into a curved or flat dry preformed shape (fabric) prior to resin infusion, or by weaving pre-impregnated fiber tows into a curved or flat preformed shape, or by weaving a hybrid fabric using both methods. In embodiments, each preformed petal shape about the centerline of the projectile and gun bore is in an arc shape having an angle of curvature in the range of about 45° to about 180°. The final assembly of all petals, which make up the sabot, can surround the projectile all 360° or just a part thereof. These sabots are not necessarily required to surround the projectile for the entire 360°.

Another embodiment is a method of making a component of a launchable device using an automated weaving process to orient straight and angled undulated fibers such that it yields a woven preform to fit in a specifically designed mold. In embodiments, automated weaving technology is used to weave fibers into a 3D woven thick-walled fabric. In some cases, the woven fibers, dry, pre-impregnated or a hybrid thereof, preform the petal shape which is later infused as needed with a resin when in the mold. In most cases, the final cured petal shall require minimal machining after molding. In embodiments, the component comprises a sabot petal.

Another embodiment is a method of making a component of a launchable device using a manual, automated or semi-automated weaving process that orients straight and angled undulated fibers and axial and lateral fibers, in a pre-engineered fiber architecture, which is then placed in a mold. In embodiments, automated weaving technology is used to weave fibers into a woven thick-walled fabric. In some cases, the woven fibers, dry, pre-impregnated or a hybrid thereof, preform the petal shape which is later infused as needed with a resin when in the mold. In many cases, the final cured petal will require final machining of the pressure flanks after molding. In embodiments, the final cured component after being machined is a sabot petal.

Yet another embodiment is a method of making a sabot petal, comprising a) fabricating a fiber composite into a woven fiber preformed petal, b) inserting the preformed petal into a mold, c) curing the preformed petal to form a cured component, d) removing the cured component from the mold, and e) machining the cured component to shape the sabot petal, e.g., the pressure flanks and grooves, and features that are not moldable.

A further embodiment is a system comprising the sabot petal described above.

Another embodiment is a sabot petal comprising an inner layer that comprises a plurality of woven undulated fibers and a plurality of straight fibers interwoven with the undulated fibers, and an outer layer comprising woven fibers. In one embodiment, the undulated fibers are angled to transfer setback loads to a projectile. This transfer may be accomplished through a plurality of pressure flanks on the inner layer of the sabot petal, which can be machined to align with a plurality of mating grooves on the projectile. In another embodiment, the sabot petal can also be a one-piece component that is configured to be positioned around a projectile.

Yet another embodiment is a component of a sabot, comprising an inner layer that comprises a plurality of woven undulated fibers angled to offset setback loads and a plurality of straight fibers interwoven with the undulated fibers, and an outer layer comprising woven fibers.

DETAILED DESCRIPTION

Figure 1:
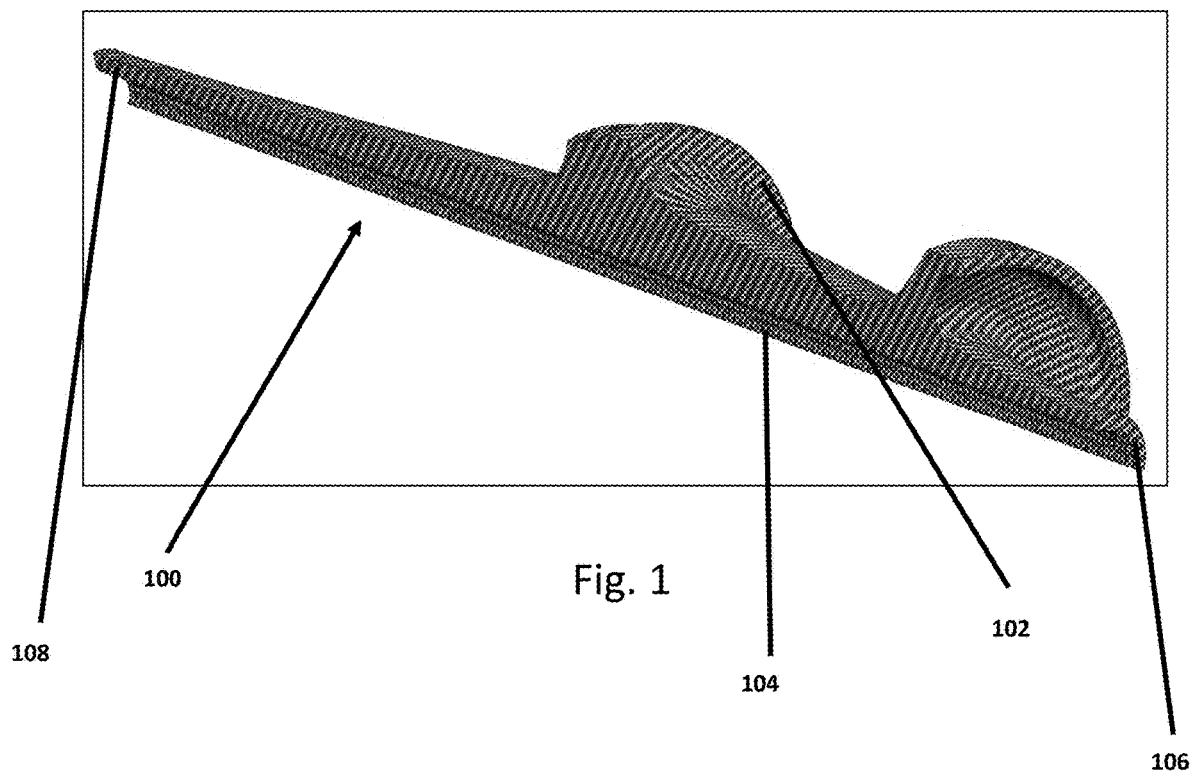
FIG. 1 shows an isometric view of a curved preformed composite petal "blank" after molding and prior to machining.

The embodiments described herein include hypervelocity projectiles, interceptors, gun launched rockets, and missile tube launches, and methods for making components for integrated launch packages. Embodiments comprise small caliber to large caliber projectiles or launch packages, including but not limited to Armor Piercing Fin Stabilized Discarding Sabot (APFSDS) projectiles. In some cases, the manufacturing process is based on fabricating the baseline composite architecture by weaving each composite petal as one-piece.

In general, the density of aluminum alloys is nearly twice the density of carbon fiber reinforced polymer composites. Therefore, using composites in place of aluminum for a typical sabot reduces the sabot mass by a nominal forty (40) to fifty (50) percent. Moreover, since the strength and stiffness of composites can be customized for each application, a more efficient and optimized sabot geometry can therefore be engineered using composites, thus the decrease in unwanted mass when compared to an aluminum counterpart can often be greater than fifty (50) percent. During the engineering design process, the choice of material, mass reduction, and methods to approach the sabot design are a function of more complex variables and requirements such as the projectile geometry, interface and boundary conditions, axial load path, loading and handling requirements, axial and lateral setback loads, torsional loads, muzzle exit velocity, bore size, costs, and so on. Other variables that can be customized include, but are not limited to number of undulating fibers, frequency of undulations, specific angle to offset setback loads, thickness of an inner layer, thickness of an outer layer, size of fiber tows, and combinations of one or more of the foregoing. The embodiments described herein do not need to address all these variables, requirements, and considerations while still being able to provide solutions to address the industry's current difficulties with manufacturing composite sabots. By designing a custom 3D preform architecture with the fiber orientations being angulated, undulated and axial, and utilizing an automated weaving machine to fabricate the final preform, a one-piece composite petal can be manufactured in either desired Cartesian, Cylindrical or Polar shaped coordinate system geometry that is configured to be positioned around the projectile. This manufacturing process and method aim to require minimal machining and removes around 90% of the manual touch-time labor when compared to the current 2D manufacturing process.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the", are intended to include the plural forms as well at the singular forms, unless the context clearly indicates otherwise.

As used herein, the term "about" refers to a measurable value such as a parameter, an amount, a temporal duration, and the like and is meant to include variations of +/−15% or less, or variations of +/−10% or less, or variations of +1-5% or less, or variations of +/−1% or less, and even variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, the term "projectile" refers to the apparatus that mates to the sabot via the pressure flanks, which can include, but is not limited to a long rod penetrator, ogive shaped airframe, airframe, rocket casing, rocket, projectile, aerostructure, aeroshell, missile, flight body, integrated launch package, payload, interceptor, and other similar terms that describe an object launched within a sabot.

As used herein, spatially relative terms, such as "beneath," "below," "lower," "above," "upper," "outer," "inner," and the like, are used for ease of description to describe one element or feature's relationship to another element(s) or feature(s) as illustrated in the figures. It is further understood that the terms "front" and "back" are not intended to be limiting and are intended to be interchangeable where appropriate.

As used herein, the term "pressure flank" refers to the buttress teeth of the sabot petal that align with the projectile. The term "mating groove" refers to the buttress teeth of the projectile that align with the pressure flanks.

As used herein, the terms "comprises" and/or "comprising", when used in this specification, specify the presence of stated features, various types of fibers and resin materials, closed cross-sectional areas, quantity of petals, varying cross-sections, various fiber architectures, supporting hardware such as riders, pusher plates, and/or groups thereof but do not preclude the presence or addition of one or more other features, integers, steps, operations, elements, components, and/or groups thereof.

As used herein, the terms "consists essentially of" and/or "consisting essentially of" specify the presence of stated features, integers, steps, operations, elements, and/or components and only preclude the presence or addition of one or more other features, integers, steps, operations, elements, components, and/or groups thereof if they materially alter the described component.

As used herein, the terms "consists of" and/or "consisting of," specify the presence of stated features, integers, steps, operations, elements, and/or components and preclude the presence or addition of one or more other features, integers, steps, operations, elements, components, and/or groups thereof.

Unless otherwise defined, all terms (including technical and scientific terms) used herein have the same meaning as commonly understood by one having ordinary skill in the art to which this invention belongs. It will be further understood that the terms, such as those defined in commonly used dictionaries, should be interpreted as having a meaning that is consistent with their meaning in the relevant and the present disclosure and will not be interpreted in an idealized or overly formal sense unless expressly so defined herein.

In describing this invention, it will be understood that several techniques are disclosed. Each of these has individual benefit and each can also be used in conjunction with one or more, or in some cases all, of the other disclosed techniques. Accordingly, for the sake of clarity, this description will refrain from repeating every possible combination of the various petal concepts. Nevertheless, the specification and claims should be read with the understanding that such combinations are entirely within the scope of the invention and claims.

A novel invention and method to reduce labor and machining by using manual, automated, and/or semi-automated machines to weave layered, interlocking undulated fibers and axial fibers in a desired fashion are discussed herein. In the following description, for purposes of explanation, numerous specific details are set forth in order to provide a thorough understanding of the disclosed embodiments.

The present disclosure is to be considered as an exemplification of the invention and is not intended to limit the invention to the specific embodiments illustrated by the figures or description below.

When a conventional gun is fired, whether it is a 50 mm, 105 mm, 120 mm, or 155 mm bore diameter caliber gun, or a 9 mm Smith and Wesson handgun, the propellant cartridges in all these systems chemically react by changing their state from a solid propellant to a high temperature high pressure hot gas that expands rapidly. This hot expanding high-pressure gas, which bears onto the aft end projectile and sabot surfaces as well as the obturator component, provides in total the force that accelerates the entire launch package down the bore of the gun. These various guns have various propellants where their gas temperatures, pressures, ignition, burn, and expansion rates differ, however they all expand and ultimately provide the pressure that accelerates their respective projectiles.

In detail, according to the embodiments described herein, a custom 3D carbon tow architecture is used, and sabot petals are fabricated using weaving (textile) machines, such that the final orientation and angles of the undulated fiber tows (later infused with resin and cured and machined into its final shape) acts as the structural load-path mechanism that transfers the setback load from the sabot pressure flank teeth to the projectile, which then is accelerated down the bore of the gun. Note that a tow is a bundle of fibers. Typical tows are designated by the total fiber count in each tow bundle such as 1 k, 3 k, 6 k, 12 k. 24 k, and 50 k, meaning there are ~1,000 fibers in a 1 k tow, ~3,000 fibers in a 3 k tow, and so on. For example, a tow manufactured by Hexcel, Inc. designated as HexTow® AS4 12 k has ~12,000 filaments with a cross-sectional tow area of 7.43e-4 in$^2$ (0.48 mm$^2$), while just one fiber filament has a diameter of 0.280e$^{-3}$ inches (7.1 microns). The candidate tows ultimately used in these embodiments consider propellant gas pressure, load paths to the penetrator, axial acceleration, lateral acceleration and rotational torque loads, pressure flank geometry, etc. For a 3D woven preform, one can deduce that minimum and typical distance from one fiber tow to the distance to a neighboring tow, be it above, below or to the side, would be a function of the matrix (resin) thickness between the two tows, or in some design between fibers. The resin thickness of the resin can be the order of a few thousandths of an inch. There is no exact value since the optimal distance between tows or between fibers is a function of the constituents being used in that composite structure, the layup, architecture and on. In general, using an industry accepted ideal maximum fiber to resin volume ratio of 70%-80% within a composite, the average distance between mating fibers and mating tows can be calculated. As described in this application, the use of the term "fiber/fibers" refers to fiber tows, not individual fibers.

Customizing exactly the angle of the undulated fibers in a woven fabric in this manner reduces costs substantially when compared to the current complicated and costly 2D layup manufacturing process. When weaving the preformed petal, a 3D-woven process involves a multilayer weaving in which several layers of fibers are interwoven and later cured to form one stable piece. The approach described herein is distinctly different from the known 2D manufacturing method. A 2D-woven process involves the stacking of several single layer woven fibers, wherein each sheet has its own unidirectional orientation. The single 2D layers are continuously stacked, rather than weaving the fibers at once. The 3D process described herein makes use of automated weaving technology such that a one-piece composite fabric sabot petal is woven into a polar/curved preformed shape ready for the mold. In embodiments, the process removes ~90% of the manual touch-time, labor, and machining as compared to conventional manufacturing techniques. The machining process completes the pressure flanks on the sabot petal. These pressure flanks align with the corresponding mating grooves on the projectile. The number of pressure flanks and mating grooves can vary depending on the projectile.

The process of one embodiment described herein involves: a) fabricating a fiber composite into a woven thick-walled fiber preformed petal, b) inserting the woven fiber preform into a mold, c) curing the woven fiber preform, d) removing the cured component from the mold, and e) machining to shape the sabot petal.

The disclosed embodiments provide a new method to fabricate APFSDS sabots and other sabots for aeroshell and aerostructure bodies alike by utilizing current textile weaving processes such that a one-piece composite fabric is manufactured into a near-net shaped preform petal. The invention also focuses on designing the fiber architecture such that the pressure flanks transfer the setback load to the projectile. Together, these inventions result in significantly lower cost sabots. The custom 3D fiber architecture purposely orients, designs, and utilizes woven fiber undulations as the load path mechanism which has never been implemented in an APFSDS launch a package or similar sabots.

This disclosure describes:
1. Using a weaving process to fabricate a one-piece arc-shaped composite preform and mold it into a petal for use with an APFSDS or other integrated launched packages.
2. A novel approach to utilize the angled undulated fibers as the load path between petal pressure flanks and projectile mating grooves.

In one embodiment, the undulated fibers are woven into a one-piece petal. The sabot petal is also one component of the final sabot subsystem. Since the weaving process and fiber architecture are customizable, the inventor configures the fiber undulation parameters of fiber and matrix material, tow and fiber size, strength, stiffness, pitch, frequency, dimensions, etc., such that the undulated fibers are oriented and properly synchronized between the pressure flanks of the sabot petals and mating grooves on the projectile. Additional customizable variables can also include those disclosed elsewhere in this application. Further, engineered axial fiber undulations are configured such that they act as the load path mechanism between petal pressure flanks and projectile mating grooves. These undulated fibers, along with straight fibers, are configured in the inner layer of the sabot petal so that they create the pressure flanks that align with the projectile, which is generally on the inside the sabot petal.

Referring to the drawings, FIG. 1 shows an isometric view of a curved preformed composite sabot petal 100 "blank" after molding and prior to machining. Using automated weaving technology, a one-piece composite fabric sabot petal 100 is woven into the polar/curved preformed shape shown in the figure. The preformed sabot petal 100 comprises and outer layer 102 and an inner layer 104. This manufacturing innovation allows the creation of the custom-shaped continuous arc length of the sabot petal 100 to be made to the desired radial degree. For three-petal sabots this arc degree would be 120°. It can be appreciated that, if there were a different number of petals, the arc of the preformed petal would increase or decrease. A two-petal sabot would have an arc of 180°, four petals each have a 90° arc, six petals each have a 60° arc, eight petals each have a 45° arc, and so on and so forth for other renditions. The petal can then be directly inserted into a closed-mold Resin Transfer Mold (RTM) with the same arc degree and receiving features, infused with resin, and then cured. After curing the petal is removed from the mold ready for final machining. The types of fibers that can include, but are not limited to, dry fibers, fibers that are pre-impregnated with resin, or a hybrid of fibers thereof. If these prepregs are used instead of dry fibers, then the resin will not need to be infused, the preform can more directly into the curing phase.

The preformed sabot petal 100 can have a Polar/Curved Weave shape, as shown. The preform can also be designed in a Cartesian or Cylindrical coordinate system. For example, the arc outer diameter of the petal is determined by the gun bore diameter, while the preform inner diameter would be governed by the projectile or any outer surface of the object being launched. Other than manually placing the preformed sabot petal 100 into the mold, and setting up the weaving machine, there are no other intensive costly manual labor steps involved. Further, in a fully automated process, the preformed petal can be placed into the mold via robotics, and when cured removed from the mold via robotics and then placed into the final milling and turning machines via robotics.

Figure 2:
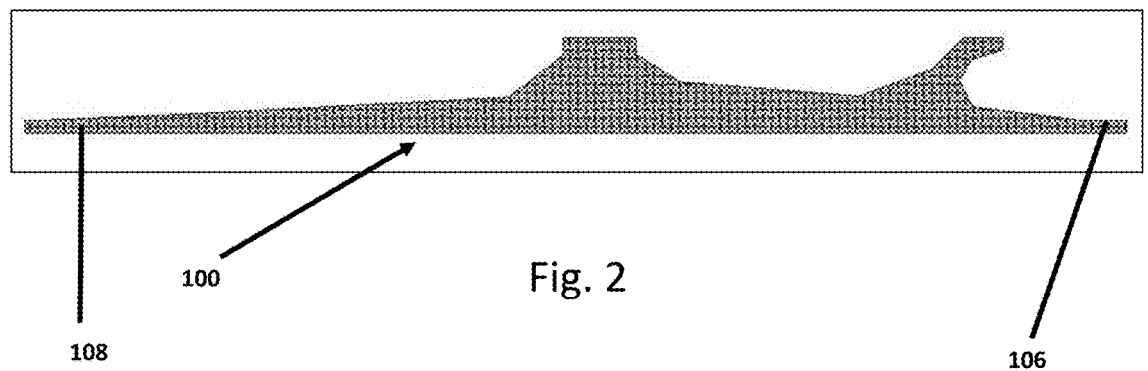
FIG. 2 is a cross sectional view of the curved preformed composite petal before it is placed in the mold.

FIG. 2 is a cross sectional view of the curved preformed woven composite sabot petal 100 before molding in FIG. 1. Notable in the cross-sectional view is the composite preform shape of the petal before molding. FIG. 2 shows the advantage for using customizable weaving machines since the "blank" can be woven such that only at certain complex locations there will be excess material to machine off. Much of the petal can be net-molded where no final machining is required. This manufacturing process significantly reduces manufacturing time and cost as compared to what is required using current 2D methods of manufacturing.

Figure 3:
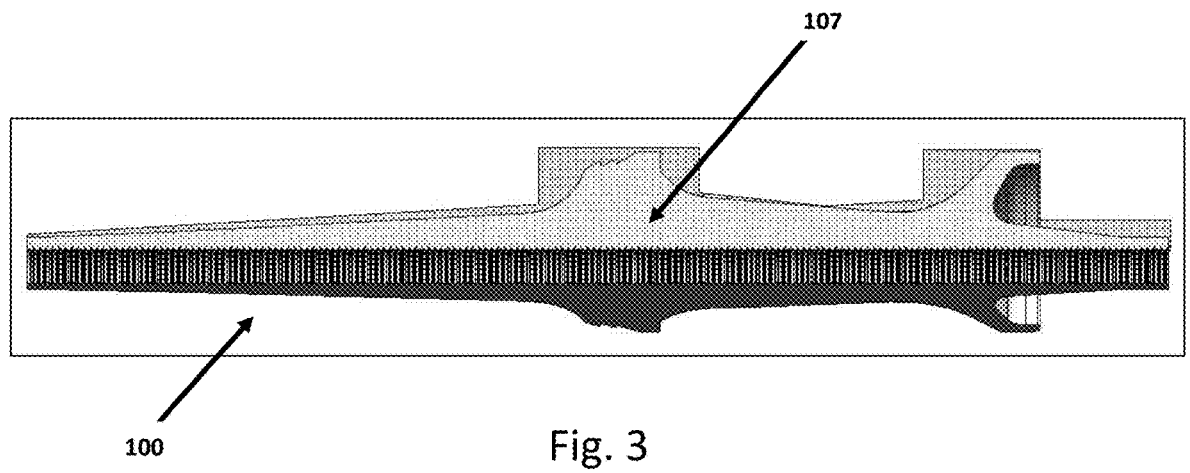
FIG. 3 shows a cross sectional view of the final machined form of the petal overlaid on the molded "blank" from FIG. 1.

FIG. 3 shows a cross sectional view of the final machined form of the petal overlaid on the "blank" from FIG. 1. The sabot petal 100 includes a petal body 107 with an inner layer 104 and an outer layer 102, a forward end 106 and a backward end 108. The machining required after the petal blank was cured and removed from the mold included an outer profile clean-up and machining of the pressure flanks and certain complex features on its outer surfaces. The final sabot petal closely resembles the one shown in FIG. 1.

Figure 4A:
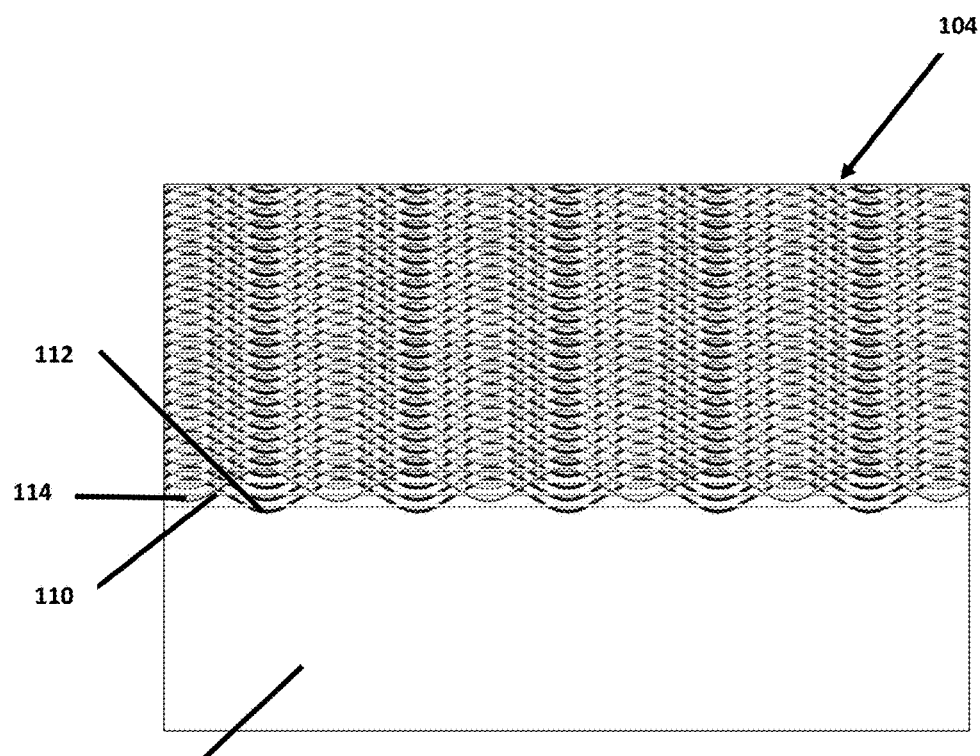
FIG. 4A is a magnified view of the pressure flanks (buttress teeth) of the petal highlighting the layers of undulated and axial fibers in a woven architecture prior to being machined.
Figure 4B:
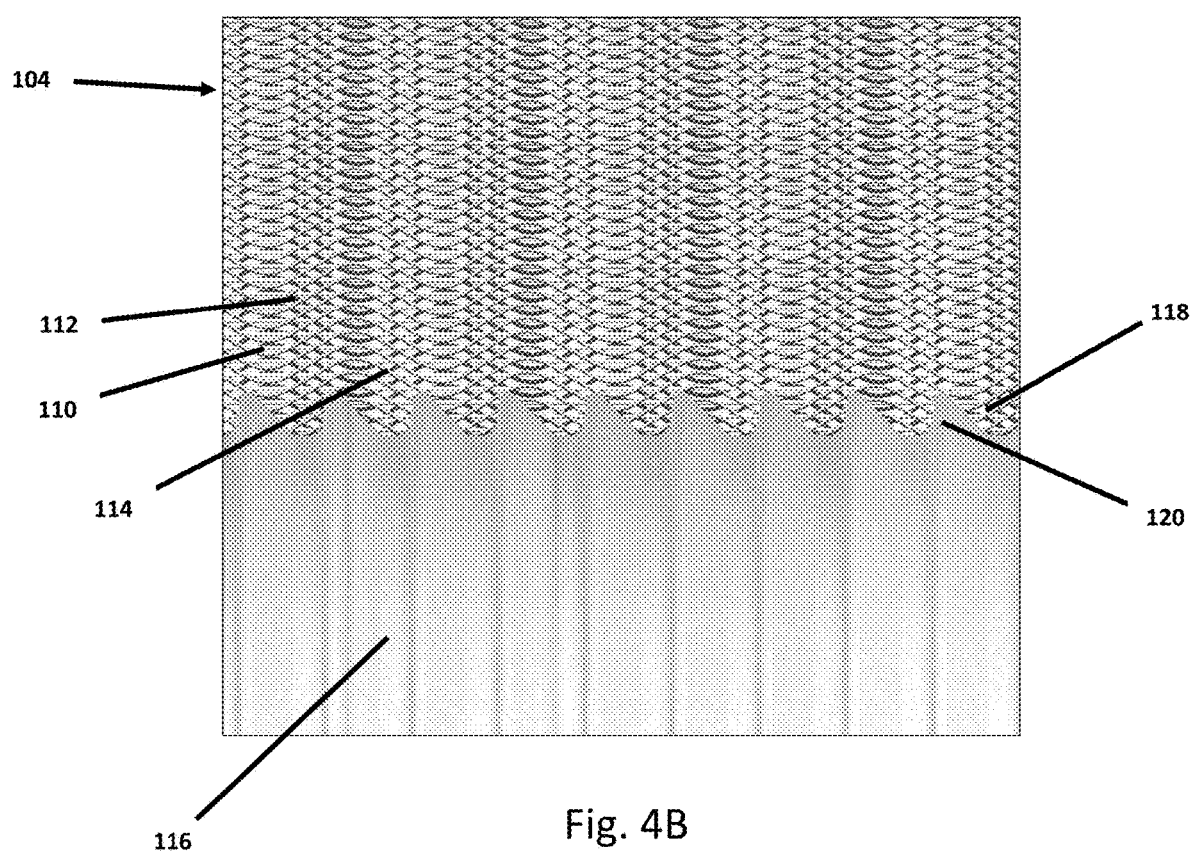
FIG. 4B is a magnified view highlighting the pressure flanks (buttress teeth) fibers in the teeth after machining, along with the mating grooves of the projectile.
Figure 5:
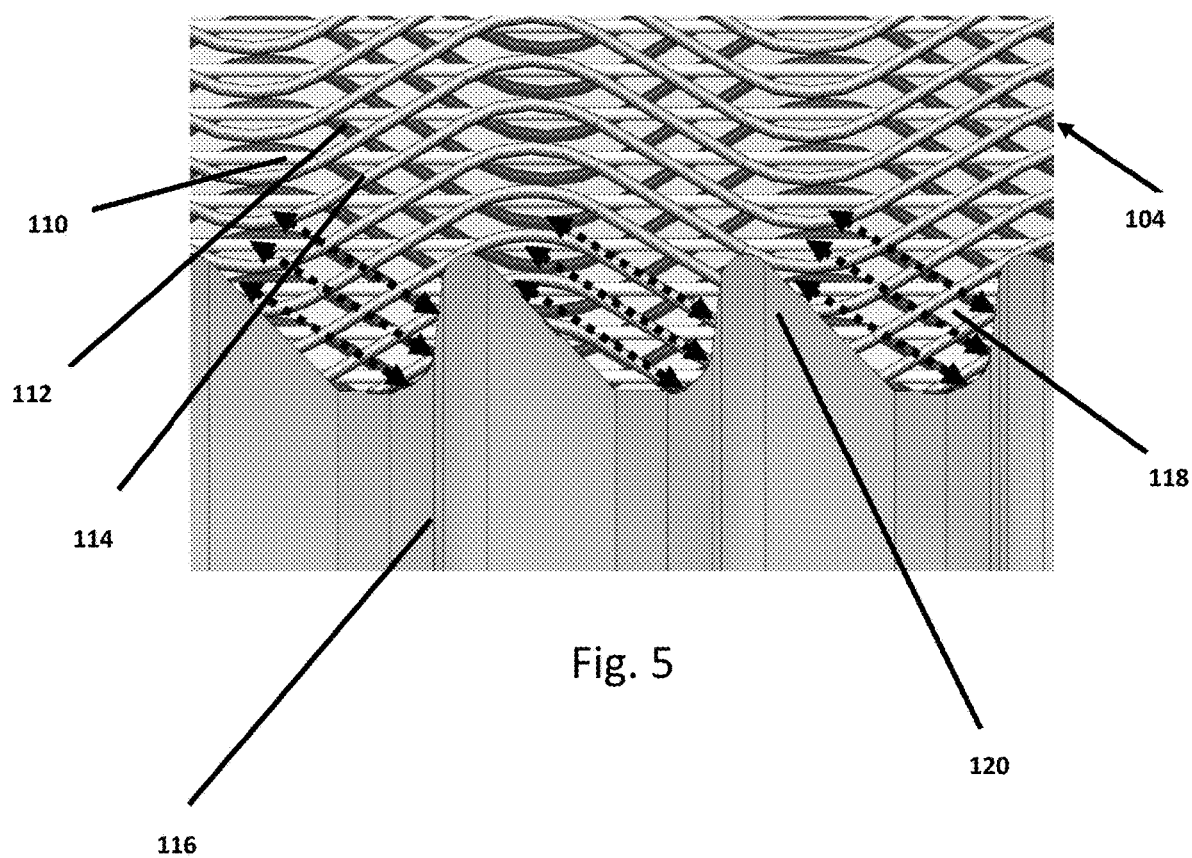
FIG. 5 is a magnified view of the petal with the layered fiber architecture post machining highlighting the pressure flank teeth and fundamental innovation where the inertial setback loads are transferred shown by arrows.

FIGS. 4A, 4B and 5 highlight isolated areas to help visualize the fiber architecture and how the fibers can be woven, placed, and oriented. These pictures are schematic and therefore do not contain the thousands of internal fibers within the petal.

FIG. 4A is a magnified view of the pressure flanks 118 of the sabot petal 100, highlighting its layers of undulated 112, 114 and straight fibers 110 in a woven architecture prior to being machined. The gray section represents a potential projectile 116 or flat surface. FIG. 4A shows the dark and light gray undulated fibers 112, 114 oriented to transfer the setback force from the sabot petal 100 to the projectile 166. The white straight fibers 110 are non-crimped fibers that can be included in the architecture to provide compressive strength and bending stiffness in the petal.

FIG. 4B is a magnified view highlighting the pressure flanks after machining. The dark and light gray fibers are considered undulated 'crimped' fibers 112, 114. These fibers are purposely undulated to transfer the setback load. The angle at which the undulated fibers 112, 114 meet the mating grooves 120 of the projectile 116 is measured from a plane parallel to the center axis of the projectile. Using this plane, the angle of the undulated fibers 112, 114 and the mating grooves 120 can be in the range of about 20° to about 70°, or about 25° to about 60°, or about 30° to about 50°. In this example, note that the dark and light gray fibers have a pitch to their undulation pattern coinciding with every other pressure flank 118, and that these two fibers 112, 114 are out of phase from one another by one pressure flank 118 pitch. The phase difference means that one set of undulated fibers 112 provides the load path for pressure flanks 118 and mating grooves 120 1, 3, 5, 7, etc., while the other set of undulated fibers 114 provide the load path for pressure flanks 118 and mating grooves 120 2, 4, 6, 8, etc. Further, although there are just two sets of undulated fibers 112, 114 in these pictures, there may be a third or fourth series of fibers undulated for load transfer. Moreover, a design can have the fibers undulated such that they all appear in each pressure flank 118 without skipping any pressure flanks and depending on the next layer of undulated fibers to take the load. Another version could have fibers undulating phased every three teeth with one tow interfacing teeth 1, 4, 7, and so on, the second fiber interfacing teeth 2, 5, 8, and on, and the third fiber interfacing teeth 3, 6, 9, and so on. All fibers could be in-phase and fully synchronized with each other and with each tooth. The synchronization of the undulated fibers with the pressure flanks and mating grooves can be customized by each sabot petal, both in the number of undulating fibers and the frequency to which the pattern coincides with the pressure flanks.

FIG. 4B also shows the interaction between the final sabot petal pressure flanks 118 on the inner layer 104 and the mating grooves 120 on the projectile 116. Depending on the projectile design and setback loads being transmitted, the pressure flank 118 dimensions would be specific and customizable depending on the user's needs. In embodiments, pressure flanks 118 can have an overall height ranging from about 0.05 to about 0.5 inches or larger depending on the projectile, can have a wall thickness similarly ranging between about 0.05 to about 0.5 inches, and pitch of about 0.1 to about 1 inch depending on the projectile design. There are no limits to these dimensions since they will depend on the projectile design and the effacing of the entire projectile. These pressure flanks 118 are machined in the inner layer 104 of the sabot petal 100. Therefore, the inner layer must be at least the same thickness the overall height of the pressure flanks. The thickness of the inner layer can also be about 1.5, 2, or 3 times the thickness of the pressure flank height, and it can be appreciated that this thickness is also customizable and the example are not limiting to this application.

Also depicted in FIGS. 4A-4B are white straight fibers 110. These are non-crimped, non-undulating fibers. These show how straight fibers are included in the architecture to provide the compressive strength, stiffness, and load path in the petal to transfer the load from the gas pressure to the undulated fibers. The straight fibers 110 can located in the pressure flank volume 118, as well as included only above the pressure flank volume in the inner layer 104, wherein the pressure flank volume comprises only of undulated fibers 112, 114.

Figure 4C:
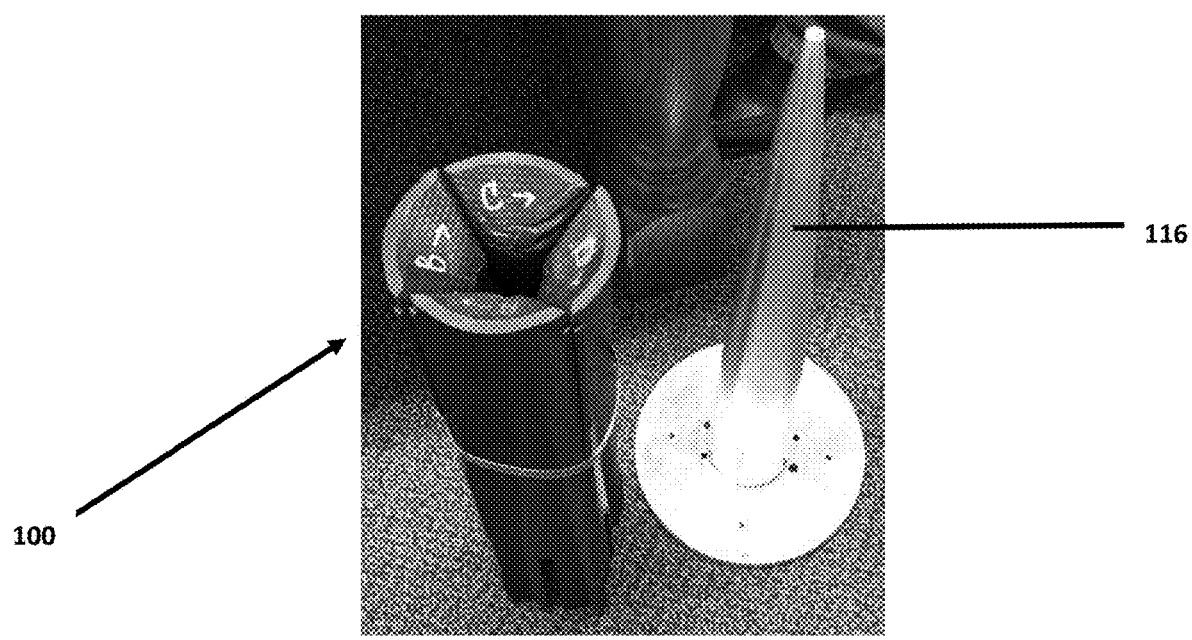
FIG. 4C shows a view of a sabot comprising of four sabot petals and a projectile.

FIG. 4C shows an assembly of four sabot petals 100 arranged to form a sabot alongside a projectile 116. As shown in the assembly, there is a space in the sabot so that a projectile 116 can fit inside the sabot. The four sabot petals 100 are placed around the projectile 116 to form a launch package that is inserted into a gun-bore or similar launching device.

FIG. 5. shows an axisymmetric axial cross-section of the projectile-sabot interface. The dark and light gray fibers 112, 114 are considered undulated 'crimped' fibers. In this example, these fibers have a pitch to their undulation pattern coinciding with every other pressure flank 118, with the light and dark gray fibers 112, 114 out of phase from one another by one pressure flank 118 pitch. The phase difference means that the dark gray fibers 112 provide the axial load path for odd numbered pressure flanks 118, while the light gray fibers 114 provide the axial load path for even numbered pressure flanks 118. The load path is shown by the dotted arrows and shows the angle at which the undulated fibers 112, 114 meet the mating grooves 120 of the projectile 116. This angle is measured from a plane parallel to the center axis of a projectile. Using this plane, the angle of the undulated fibers 112, 114 and the mating grooves 120 can be in the range of about 20° to about 70°, or about 25° to about 60°, or about 300 to about 50°. These angles can be larger or smaller depending on the design the mating grooves and pressure flanks. A third or fourth series of undulated fibers could be added to further assist in the load transfer. Referencing FIG. 4A it depicts the undulated fibers and straight fibers resin infused and cured prior to machining. As a result of machining the pressure flanks the fibers become noncontinuous as depicted in FIG. 4B. The section of fibers removed during machining does not affect the function of the remaining fibers because the fiber orientation need only be in the angular direction.

Figure 6:
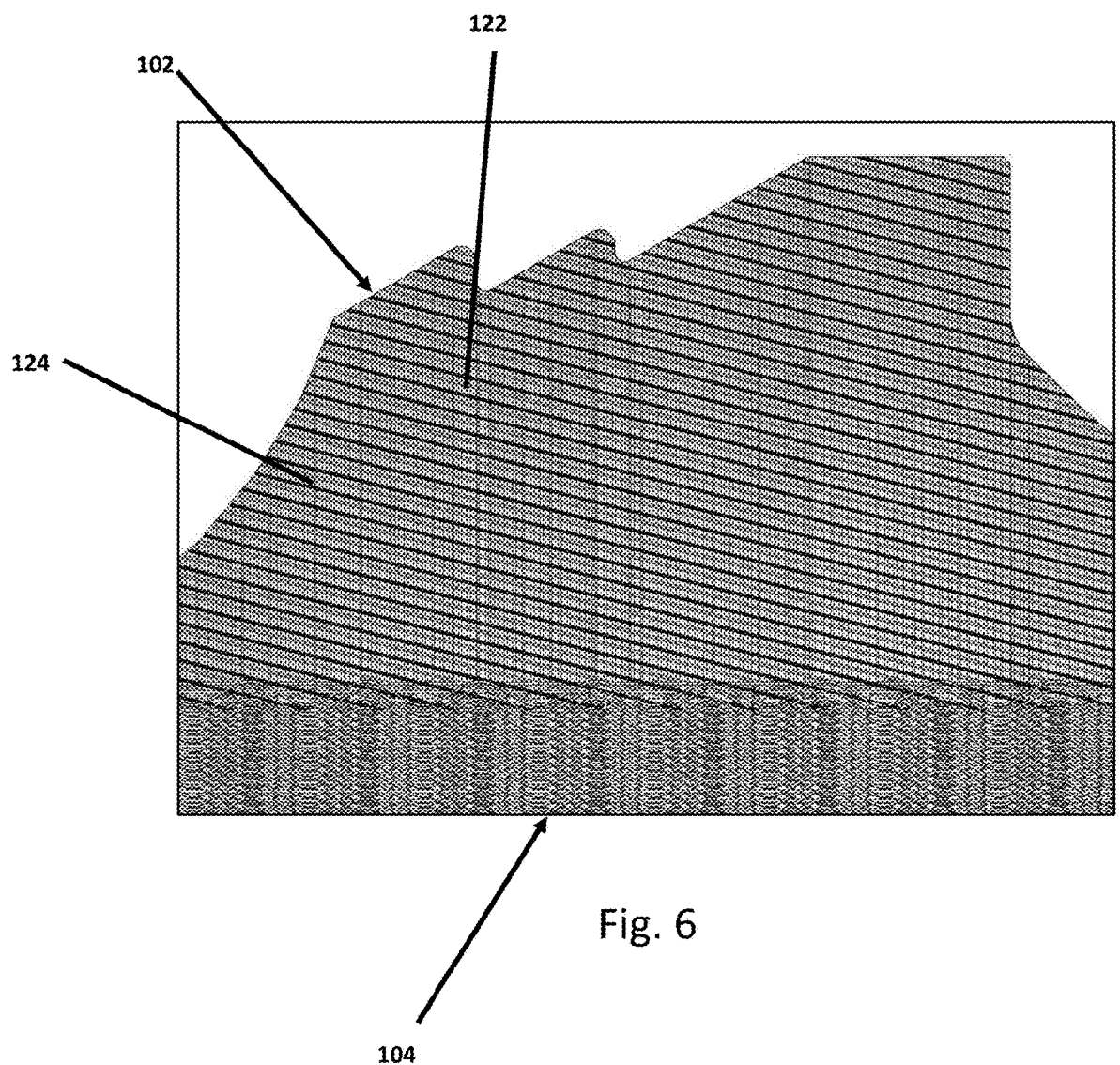
FIG. 6 is an axisymmetric view highlighting the petal mid-body generalized condition, showing, as an example, how the weaving process provides the ability to orient fibers in a non-angled, non-undulated manner as a needed architecture for performance.

FIG. 6 depicts a non-limiting example of an axisymmetric view of the sabot petal 100 mid-body. The petal mid-body is an important feature which provides the main structure to react against the propellant pressure, provides radial stiffness for the obturator, and the initial body for the load path to transfer all the setback load to the projectile. Both the inner layer 104 and the outer layer 102 can be seen in the figure. In the outer layer 102, there are two different orientations of fibers: axial fibers 122 and radial fibers 124. The radial fibers 124 provide radial stiffness for the obturator seat and ballotting loads. The woven axial 122 and radial 124 fibers can be configured in the outer layer of the sabot petal to provide the required strength and stiffness during launch. Depending on the performance requirement of a sabot and its petals, these mid-body woven architectures can be engineered and oriented as necessary.

Non-limiting examples of suitable reinforced matrices in these composites petals include polymers such as bismaleimide (BMI), epoxy, polyester, fluoropolymers, phenolics, cyanate ester, or vinyl ester, and even metal matrix resins, with fibers such as carbon, boron, glass, aramids, basalt, and polymer fibers such as nylon.

Another embodiment is a method of making a sabot petal, the steps comprising a) fabricating a composite into a woven thick-walled fiber preformed petal; b) inserting the preformed petal into a mold; c) curing the preformed petal to form a cured component; d) removing the cured component form the mold; and e) machining to shape the sabot petal.

When designing the fiber architecture, it can be appreciated that the qualities and variables listed above are considered in this method. This includes, but is not limited to, the choice of fibers being dry, pre-impregnated, or a hybrid method, using a combination of undulating and straight fibers in the inner layer of the sabot petal, creating a curved preform shape, and customizing the degree of the arc depending on the total number of petals.

When fabricating and weaving the preformed petal, the petal can be woven using either a manual, automated, or semi-automated process. This process orients and angles the fibers in the petal according to the configuration step. Also, it is appreciated that, if the weaving step contains only pre-impregnated fibers, the preform does not need to be infused with resin. This means that, after weaving the preform with pre-impregnated fibers, the preform can directly go to the curing step. If the performed petal comprises dry fibers, the process can include a further step of infusing the preform with resin after it is interested into the mold but before curing. The process can further comprise of an earlier step, in which the preformed petal is designed and customized to fit the desired projectile. This step would be done prior to step a) when the preformed petal is fabricated. During this designing step, several factors can be considered, including but not limited to number of undulating fibers, frequency of undulations, specific angle to offset setback loads, thickness of an inner layer, thickness of an outer layer, size of fiber tows, projectile geometry, interface and boundary conditions, axial load path, loading and handling requirements, axial and lateral setback loads, torsional loads, muzzle exit velocity, bore size, costs, and combinations of one or more of the foregoing.

Yet another embodiment of the invention relates to a component of a sabot. This component also comprises an inner layer that comprises a plurality of woven undulated fibers angled to offset setback loads and a plurality of straight fibers interwoven with the undulated fibers along with an outer layer comprising woven fibers. It can be appreciated that the above description of a sabot petal also relate to and describe the component of a sabot.

A number of alternatives, modifications, variations, or improvements therein may be subsequently made by those skilled in the art, which are also intended to be encompassed by the following claims.

What is claimed is:

1. A sabot petal, comprising:
   a) an inner layer comprising:
      i. a plurality of woven undulated fibers;
      ii. a plurality of straight fibers interwoven with the undulated fibers; and
   b) an outer layer comprising woven fibers.

2. The sabot petal of claim 1, wherein the undulated fibers are angled to transfer setback loads to a projectile.

3. The sabot petal of claim 2, wherein the setback loads are transferred through a plurality of pressure flanks on the sabot petal to a plurality of mating grooves on the projectile.

4. The sabot petal of claim 3, wherein the undulated fibers are machined so that the undulated fibers form the pressure flanks that align with the mating grooves.

5. The sabot petal of claim 4, wherein the undulated fibers meet the mating grooves at an angle in the range of about 20° to about 70°, wherein the angle is measured from a plane that is parallel with a center axis of the projectile.

6. The sabot petal of claim 1, wherein the woven fibers in the outer layer further comprise a plurality of woven axial and radial fibers.

7. The sabot petal of claim 1, wherein the petal is a one-piece component configured to be positioned around a projectile.

8. The sabot petal of claim 7, further comprising at least one of a carbon, glass, boron, and polymer fiber reinforced matrix.

9. The sabot petal of claim 1, wherein the petal is woven into a curved preformed shape prior to resin infusion.

10. The sabot petal of claim 1, wherein the petal is a preformed petal in an arc shape having an angle of curvature in the range of about a 45° to about a 180°.

11. A method of making a sabot petal, comprising:
    a) fabricating a fiber composite into a 3D-woven thick-walled fiber preformed petal;
    b) inserting the preformed petal into a mold;
    c) curing the preformed petal to form a cured component;
    d) removing the cured component from the mold; and
    e) machining the cured component to shape the sabot petal.

12. The method of claim 11, wherein the step of fabricating is accomplished using at least one of a manual, automated, and semi-automated process to orient and angle fibers in the fiber composite.

13. The method of claim 11, wherein prior to the fabricating step (a), the fiber composite is customized by at least one variable selected from the group consisting of number of undulating fibers, frequency of undulations, specific angle to offset setback loads, thickness of an inner layer, thickness of an outer layer, size of fiber tows, and combinations of one or more of the foregoing.

14. The method of claim 11, further comprising infusing the preformed petal with resin after the inserting step.

15. The method of claim 14, wherein the preformed petal comprises dry fibers.

16. The method of claim 11, wherein the preformed petal comprises fibers that are a combination of undulating and straight fibers.

17. The method of claim 11, wherein the preformed petal is in a curved shape.

18. The method of claim 11, wherein after the fabricating step (a), the preformed petal is directly inserted into the mold.

19. A component of a sabot comprising:
    a) an inner layer comprising:
       i. a plurality of woven undulated fibers angled to offset setback loads;
       ii. a plurality of straight fibers interwoven with the undulated fibers; and
    b) an outer layer comprising woven fibers.

20. The component of claim 19, wherein the angled undulated fibers and the straight fibers are configured in the inner layer of a sabot body of the sabot.

* * * * *